United States Patent
Mallebrein et al.

(10) Patent No.: US 7,895,987 B2
(45) Date of Patent: Mar. 1, 2011

(54) METHOD FOR INTRODUCING FUEL INTO A COMBUSTION CHAMBER OF AN INTERNAL COMBUSTION ENGINE

(75) Inventors: Georg Mallebrein, Korntal-Muenchingen (DE); Michael Frank, Vaihingen/Enz (DE); Alexander Schenck Zu Schweinsberg, Moeglingen (DE); Helerson Kemmer, Vaihingen (DE); Wolfgang Samenfink, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/505,080

(22) Filed: Jul. 17, 2009

(65) Prior Publication Data
US 2010/0037852 A1 Feb. 18, 2010

(30) Foreign Application Priority Data
Aug. 13, 2008 (DE) .................. 10 2008 041 237

(51) Int. Cl.
*F02B 3/00* (2006.01)
*F02B 7/00* (2006.01)
*F02M 7/00* (2006.01)

(52) U.S. Cl. .................... 123/299; 123/431; 123/436

(58) Field of Classification Search ............ 123/299, 123/300, 304, 305, 431–436; 701/103, 104
See application file for complete search history.

(56) References Cited

U.S. PATENT DOCUMENTS

| | | | | |
|---|---|---|---|---|
| 5,094,210 A | * | 3/1992 | Endres et al. | 123/432 |
| 6,230,683 B1 | * | 5/2001 | zur Loye et al. | 123/435 |
| 6,516,774 B2 | * | 2/2003 | zur Loye et al. | 123/299 |
| 6,561,157 B2 | * | 5/2003 | zur Loye et al. | 123/295 |
| 6,684,849 B2 | * | 2/2004 | Pierz et al. | 123/295 |
| 7,082,926 B2 | * | 8/2006 | Sadakane et al. | 123/431 |
| 7,159,568 B1 | * | 1/2007 | Lewis et al. | 123/431 |
| 7,357,101 B2 | * | 4/2008 | Boyarski | 123/1 A |
| 7,409,926 B2 | * | 8/2008 | Sun et al. | 123/1 A |
| 7,426,918 B2 | * | 9/2008 | Brehob et al. | 123/431 |
| 7,461,628 B2 | * | 12/2008 | Blumberg et al. | 123/304 |
| 7,581,528 B2 | * | 9/2009 | Stein et al. | 123/431 |
| 7,712,451 B2 | * | 5/2010 | Hung et al. | 123/431 |
| 2007/0119411 A1 | * | 5/2007 | Kerns | 123/295 |
| 2007/0119415 A1 | * | 5/2007 | Lewis et al. | 123/295 |
| 2007/0215127 A1 | * | 9/2007 | Dearth et al. | 123/568.15 |
| 2007/0289573 A1 | * | 12/2007 | Leone et al. | 123/305 |

FOREIGN PATENT DOCUMENTS

WO WO 2006/095515 9/2006

* cited by examiner

*Primary Examiner* — Stephen K Cronin
*Assistant Examiner* — Johnny H Hoang
(74) *Attorney, Agent, or Firm* — Kenyon & Kenyon LLP

(57) ABSTRACT

A method for introducing fuel into a combustion chamber of an internal combustion engine is provided, in which fuel is injected at variable metering directly into the combustion chamber by a first fuel injector on the one hand, and into an air aspiration channel leading to the combustion chamber by a second fuel injector on the other hand. To ensure a reliable cold start of the internal combustion engine when using regenerative fuels even at low temperatures, in the cold start of the internal combustion engine a partial quantity of the required overall fuel quantity is injected via the second fuel injector, this partial quantity being the particular fuel quantity that exceeds a maximum fuel quantity able to be injected via the first fuel injector.

7 Claims, 1 Drawing Sheet

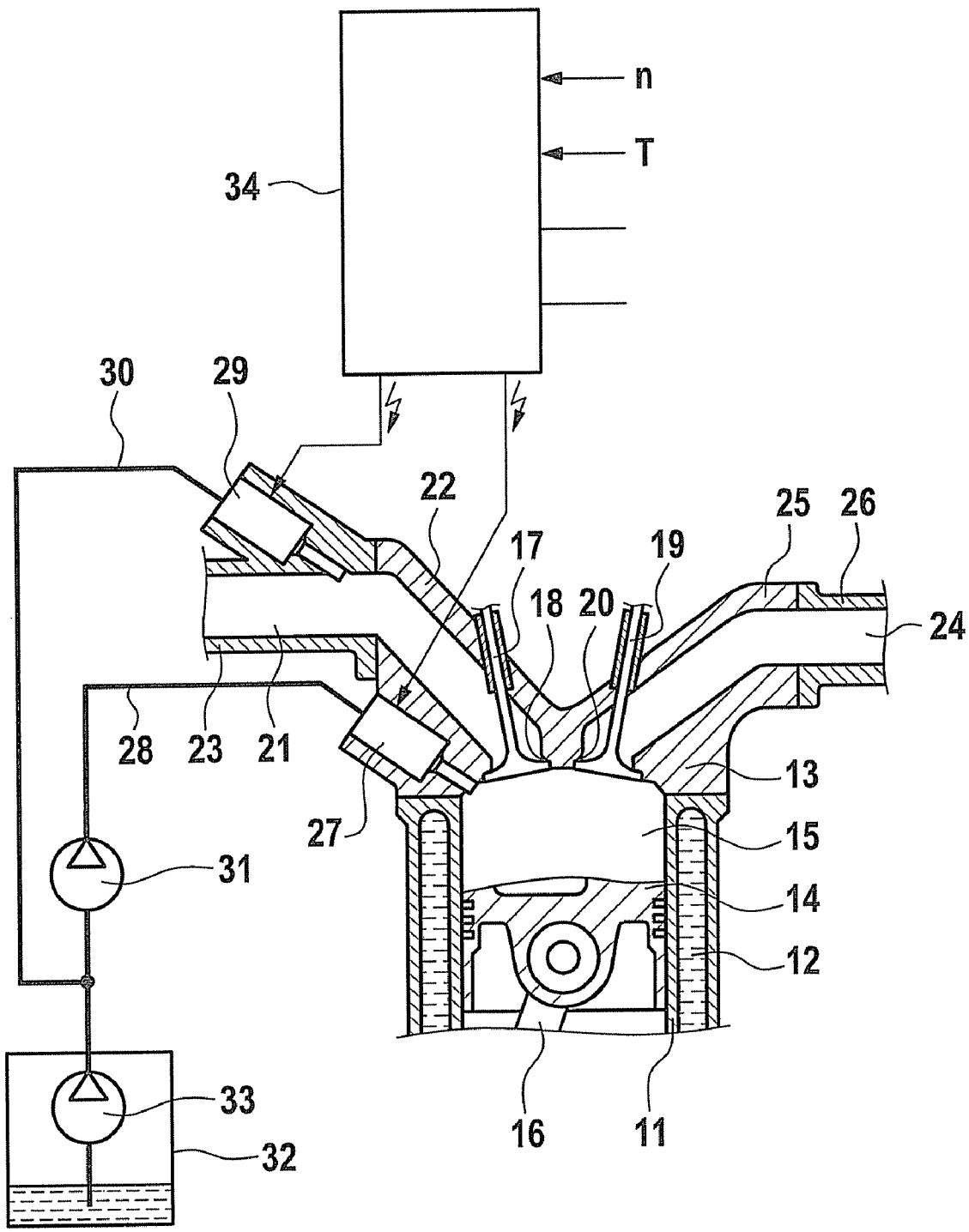

METHOD FOR INTRODUCING FUEL INTO A COMBUSTION CHAMBER OF AN INTERNAL COMBUSTION ENGINE

BACKGROUND INFORMATION

In one known method (PCT International Patent Publication No. WO 2006/095515), for better utilization of the fuel and for reducing the nitrogen-oxide emissions, the two fuel injectors are controlled in such a way that when the internal combustion engine is operating in a specific operating range and the control mechanism for the intake valves reduces the opening lift or the opening duration of the intake valves, the portion of the fuel that is injected directly into the combustion engine rises according to the amount of the reduction of the opening lift or the opening duration. The increased direct injection prevents a deterioration of the satisfactory mixing of the fuel in the combustion chamber that is required in a lean mixture combustion.

The increasing use of regenerative fuels such as ethanol requires a bi-fuel utilization by Otto engines, of regular fuel and regenerative fuel and also any mixtures of both types of fuel, without manual resetting being necessary. The low fuel value of ethanol, for instance, calls for the injection of a considerably higher fuel quantity in ethanol operation, and the higher evaporation temperature of ethanol in comparison with gasoline requires yet a further increase in the fuel quantity at very cold temperatures. In internal combustion engines having direct injection, the maximally possible injection quantity is defined by the applied fuel pressure, the throughput of the fuel injectors, and the cycle time specified by the engine speed. Since the throughput of the fuel injectors must be adapted to the minimally required injection quantity for a warm internal combustion engine, only the delivery rate of the fuel pump could be increased to provide the increased fuel quantity.

SUMMARY OF THE INVENTION

The method according to the present invention has the advantage that when the internal combustion engine is operated using regenerative fuels, the available fuel injectors are used for the intake-manifold injection in order to inject, in addition to the fuel injectors injecting directly into the combustion chamber, the increased fuel quantity required for the cold start of the internal combustion engine, which is not negligible especially at low temperatures. The metering of fuel implemented by both fuel injectors in the cold start of the internal combustion engine, which encompasses the start phase, post-start phase and warm-up phase, achieves a sufficient fuel supply of the combustion chamber, with a throughput of the directly injecting fuel injectors that continues to be adapted to the warm internal combustion engine, without the need to increase the delivery rate of the high-pressure fuel pump for the cold start of the internal combustion engine. Therefore, it is possible to dispense with the use of a high-pressure pump having a higher delivery rate. The latter would be disadvantageous inasmuch as a high-pressure pump having a supply capacity configured for the cold start of the internal combustion engine would have to be permanently controlled toward a gradual shutoff during normal operation.

BRIEF DESCRIPTION OF THE DRAWING

The FIGURE shows a detail of a longitudinal section of a combustion cylinder of an internal combustion engine in connection with a fuel supply system.

DETAILED DESCRIPTION

Only one combustion cylinder 11 of a normally multi-cylinder internal combustion engine for motor vehicles, for example, is shown in the FIGURE in a cutaway view. Combustion cylinder 11, surrounded by a jacket of cooling water 12, is covered at the end face by a cylinder head 13 in a gas-tight manner. A reciprocating piston 14 guided inside combustion cylinder 11 so as to be axially displaceable delimits a combustion chamber 15 jointly with cylinder head 13. Reciprocating piston 14 is connected to a crankshaft (not shown here) via a connecting rod 16.

Combustion chamber 15 has an intake 18, which is able to be closed by an intake valve 17, and an outlet 20, which is able to be closed by a discharge valve 19. An air aspiration channel 21, which is formed by an intake nipple 22 developed inside cylinder head 13 and a suction manifold 23 mounted on intake nipple 22, are routed to intake 18. Branching off from outlet 20 is an exhaust gas duct 24, which is formed by a discharge connection 25 in cylinder head 13 and an exhaust pipe 26 mounted on discharge connection 25.

A first fuel injector 27, which is able to inject fuel supplied via a fuel supply line 28 directly into combustion chamber 15, is installed inside cylinder head 13. A second fuel injector 29, which is able to inject fuel supplied via a fuel supply line 30 into air aspiration channel 21, is situated in air aspiration channel 21, in this case in intake manifold 23, the injection direction being specified in such a way that the wall region of intake nipple 22 situated directly in front of fuel injector 17 is wetted by the atomized fuel. Fuel supply line 28 to directly injecting first fuel injector 27 is connected to a high-pressure fuel pump 31, which in turn is connected to a low-pressure fuel pump 33 supplying fuel from a fuel tank 32. Fuel supply line 30 to second fuel injector 29 injecting into air aspiration channel 21 is connected to low-pressure fuel pump 33. Both fuel injectors 27, 29 are controlled by an electronic control unit 34, which is supplied with a multitude of operating parameters of the internal combustion engine, rotational speed n and temperature T of the internal combustion engine being among them.

The fuel supply of combustion chamber 14, i.e., the fuel quantity injected during the cycle times of the gas exchange, may be implemented in distributed fashion by both fuel injectors 27, 29, but also completely by one of the two fuel injectors 27, 29, depending on the prevailing operating conditions. One option for such a fuel injection, in which the focus lies on reducing the nitrogen oxide emissions for fully charged Otto engines, is described in PCT International Patent Publication No. WO 2006/095515.

Given increasing use of regenerative fuels, e.g., ethanol, the internal combustion engine must be operable using both regular fuel and ethanol as well as all types of mixtures of both fuels, without manual adaptation or switchover. Because of the lower fuel value of ethanol, a considerably higher fuel quantity must be injected in ethanol operation. The increased evaporation temperature of ethanol in comparison with fuel requires an even further, much higher fuel quantity, especially at very cold temperatures such as −30° C., for example.

To ensure a reliable startup of the internal combustion engine when regenerative fuels are used, during the cold start control unit 34 controls fuel injectors 27, 29 in such a way that second fuel injector 29 injects a partial quantity of the overall fuel quantity required for a reliable startup of the internal combustion engine into air aspiration channel 21, which reaches combustion chamber 15 largely homogenously mixed with the aspirated combustion air when intake valve 17 is opened. Only the particular fuel quantity that exceeds a maximum fuel quantity able to be injected directly into combustion chamber 15 by first fuel injector 27 is injected via second fuel injector 29. To this end, control unit 24 calculates in advance, prior to the start, the overall fuel quantity required for the reliable start on the basis of starting engine speed n and instantaneous starting temperature T of the internal combustion engine. The value of the maximum fuel quantity able to be injected via first fuel injector 27 is stored in control unit 34. The value of the overall fuel quantity required for the intended start of the internal combustion engine currently calculated by control unit 34, is then compared to the stored value. If the precalculated value exceeds this stored value, then control unit 34 activates second fuel injector 29, so that the residual fuel quantity that exceeds the maximum injection quantity by first fuel injector 27, is injected into air aspiration channel 21 by second fuel injector 29 a short distance in front of fuel injector 17.

What is claimed is:

1. A method for introducing fuel into a combustion chamber of an internal combustion engine, comprising:
    injecting fuel at variable metering with aid of a first fuel injector directly into the combustion chamber, and with aid of a second fuel injector into an air aspiration channel leading to the combustion chamber;
    calculating the overall fuel quantity required for the reliable cold start of the internal combustion engine, in advance, prior to the start, on the basis of a starting engine speed and an instantaneous starting temperature of the internal combustion engine; and
    when regenerative fuels are used, injecting a partial quantity of an overall fuel quantity required for a reliable cold start of the internal combustion engine by the second fuel injector.

2. The method according to claim 1, wherein a particular fuel quantity that exceeds a maximum fuel quantity able to be injected by the first fuel injector is injected as the partial quantity via the second fuel injector.

3. The method according to claim 1, further comprising:
    comparing a value of the precalculated overall fuel quantity to a stored value of a maximum fuel quantity that is able to be injected by the first fuel injector; and
    activating the second fuel injector only if the value of the fuel quantity maximally able to be injected by the first fuel injector is exceeded.

4. The method according to claim 3, wherein the calculation of the overall fuel quantity is implemented in an electronic control unit in which the value of the maximum fuel quantity able to be injected via the first fuel injector is stored, and the electronic control unit controls the fuel injectors.

5. The method according to claim 1, wherein the first fuel injector is connected to a high-pressure fuel pump and the second fuel injector is connected to a low-pressure fuel pump.

6. The method according to claim 1, wherein the regenerative fuel is ethanol.

7. The method according to claim 1, wherein the reliable cold start of the internal combustion engine includes at least one of a (i) start phase, (ii) post-start phase, and (iii) warm-up phase.

* * * * *